Feb. 12, 1924.
P. J. G. SMITH
ANIMAL TRAP
Filed Feb. 16, 1923
1,483,688
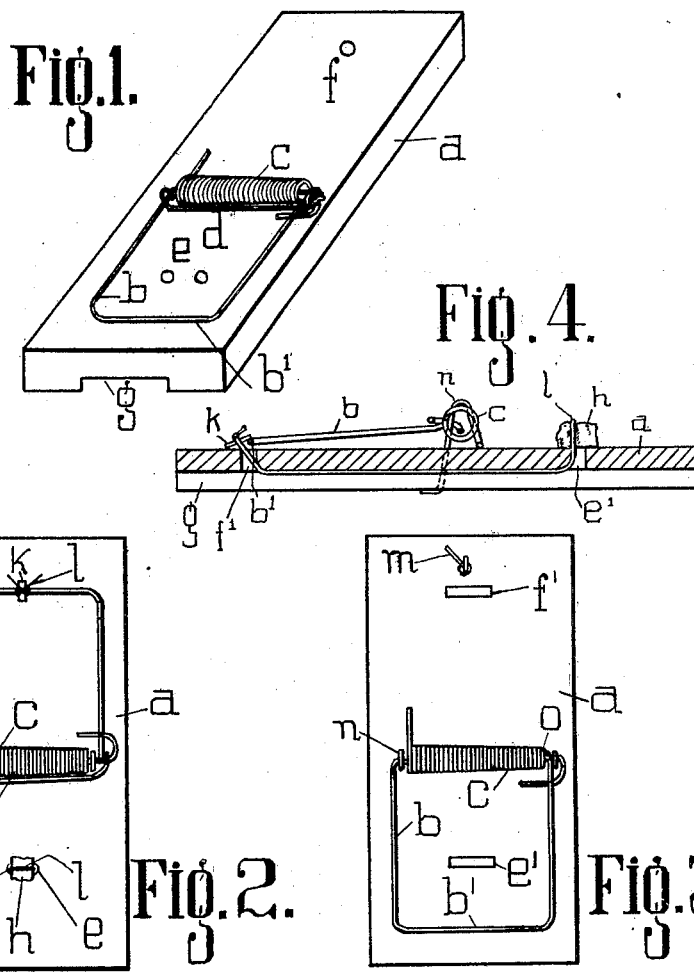

Patented Feb. 12, 1924.

1,483,688

UNITED STATES PATENT OFFICE.

PERCIVAL J. GRANT SMITH, OF PORT ST. MARY, ISLE OF MAN.

ANIMAL TRAP.

Application filed February 16, 1923. Serial No. 619,421.

*To all whom it may concern:*

Be it known that I, PERCIVAL JAMES GRANT SMITH, a subject of the King of Great Britain, residing in Port St. Mary, Isle of Man, have invented certain new and useful Improvements in and Relating to Animal Traps, of which the following is a specification.

This invention relates to animal traps such as mouse traps, rat traps and the like and has for its object so to construct such traps that they can be set without fear of shock owing to the catch releasing its hold prematurely whilst the trap is in the hand, and that the bait cannot be removed or eaten up without releasing the catch.

One of the chief features of this invention is that the bait itself serves as a rigid element of detent means for the killing mechanism. Thus the bait may be held in position on a flat piece of wood or other suitable material, hereinafter referred to as the "board" by a loop of twine or string, wire or the like which may be termed a cable, the ends of which pass down through an opening or openings in the board to the under surface of the board and up through an opening or openings in the board to the upper surface of the board where they are tied over a pivoted catch rod or over a loose catch piece which holds the killing mechanism in the set position, the strings having full play by running in a clear space underneath the board. The way in which this apparatus acts is as follows:—

As the mouse or other creature to be caught eats away the bait from under the loop of twine or string which holds it the strings pay out, finally causing the catch to release its hold.

In the accompanying drawings:—

Figure 1 is a general view of a mouse trap of the break-back type constructed according to this invention.

Figure 2 is a plan view of the same trap set ready for action.

Figure 3 is a plan view of a modification of the trap illustrated by Figures 1 and 2 in the sprung position.

Figure 4 is a longitudinal vertical section through the trap in the set position.

Referring to Figure 1 which illustrates a mouse trap of the break-back type constructed according to this invention:—*a* designates the board, *b* a wire break-back frame which kills the mouse by pinning it to the board, *c* a coiled wire spring which operates the wire frame *b*, *d* a piece of wire with staple ends fixing the spring to the board, *e, e,* small holes, hereinafter referred to as the "bait holes" going right through the board, *f* a somewhat larger hole at the opposite end of the board, hereinafter referred to as the "catch hole" going right through the board, *g* a groove running along the under surface of the board to keep the strings from touching the ground. Instead of being grooved out underneath, the board may be raised off the ground by studs or narrow strips of wood or other suitable material attached to the margin of its under surface. The wire break-back frame *b* and actuating spring *c* as illustrated are of known pattern.

Figure 2 shows a plan view of the same trap set ready for action, *h* designates the bait with the loop of twine *l* passing over it, *k* a loose catch with the ends of the twine tied over it.

Figure 3 is a plan view of a modification of the trap illustrated by Figures 1 and 2 and shows slots *e′, f′* instead of the holes *e, f,* and a wire catch *m* attached to the board. The spring *c* is attached to the board by two small staples *n, o*.

Figure 4 is a vertical section showing the manner in which the bait *h* and the catch *k* are held by the cable or twine *l*.

The method of setting a mouse trap (Fig. 1) constructed according to this invention is as follows:—

Have ready two pieces of twine 3 feet and 1½ feet long respectively, a piece of wooden match-stick barely ⅛ inch thick and 1½ inch long, and a dice of hard crusty cheese or a shelled peanut or other suitable bait. Pass the ends of the short piece of twine down through the bait holes, *e, e,* one end through each hole, and then pass the two ends together up through the catch hole *f* and pull them through. Force back the break-back frame *b* as far as it will go, taking care that the two ends of twine come out behind it. Hold the frame *b* back with the thumb of the left hand and temporarily bind it back hard to the board *a* by winding the long piece of twine round the trap from side to side so that it passes over the centre of the side wires of the frame *b*. Place the bait under the loop of the first piece of twine and pull the loop tight over it. Lay the piece of match stick about ⅛ of an inch over the end part of the break-back frame and between the two ends of twine, and tie the twine tightly over it, the knot being made over the middle of the piece of match stick. Unloose the second piece of string which temporarily held the frame down and the trap is set ready for action. In resetting the trap it is not always necessary to untie the knot, provided the strings are intact. Whatever kind of bait is used, it must be sufficiently hard to prevent the twine from cutting into it and it must not be so wide as to jam the strings which should be allowed to run freely. A good way to test the working of the trap is to place the loop at the holes e, e, just above the pointed end of a lead pencil to represent the bait. By gradually withdrawing the pencil, the loop will slip down causing the strings to pay out and so release the catch.

Apart from the absolute simplicity of its construction a mouse trap operated on this new principle has two great advantages, viz:—

1. It can be set in comfort and without any fear of it going off whilst in the hand with that well known vicious snap so startling to a person of sensitive nerves. If it is set hard, which is the proper way to set it, the trap can be dropped down on to the floor without the catch releasing its hold.

2. The release of the catch does not depend on the push or pull of the mouse at the bait, or on the weight of the mouse; the smallest of mice cannot remove or eat up the bait without releasing the catch and actuating the break-back frame. The same holds good in the case of traps according to this invention intended to catch other sorts of creatures.

I declare that what I claim is:—

1. An animal trap comprising a base, a spring break-back, a rigid bait, a cable passing round said bait and held taut thereby, and a detent held in position by the taut cable.

2. An animal trap comprising a spring break-back, a cable, a base plate recessed on its under side for the reception of the cable and at least two perforations in said base only slightly wider than the thickness of said cable, a rigid bait to hold the cable taut and a detent held in position by the taut cable.

In witness whereof, I have hereunto signed my name this 16th day of January 1923, in the presence of two subscribing witnesses.

P. J. GRANT SMITH.

Witnesses:
LEONARD ELLWOOD JONES,
DOROTHY GRAY.